United States Patent [19]
Rickard

[11] Patent Number: 5,828,293
[45] Date of Patent: Oct. 27, 1998

[54] DATA TRANSMISSION OVER A POWER LINE COMMUNICATIONS SYSTEM

[75] Inventor: Robin Paul Rickard, Hertfordshire, Great Britain

[73] Assignee: Northern Telecom Limited, Montreal, Canada

[21] Appl. No.: 871,930

[22] Filed: Jun. 10, 1997

[51] Int. Cl.$^6$ .................................................. H04M 11/04
[52] U.S. Cl. ............................... 340/310.04; 340/310.01; 375/257; 455/63
[58] Field of Search ......................... 340/310.01, 310.03, 340/310.04; 375/259, 257, 258, 295; 455/3.3, 63, 66, 402

[56] References Cited

U.S. PATENT DOCUMENTS

| | | | |
|---|---|---|---|
| 3,895,369 | 7/1975 | Ono et al. ............................ | 340/310.04 |
| 4,097,692 | 6/1978 | Felix .................................... | 340/310.04 |
| 4,528,667 | 7/1985 | Fruhauf ................................ | 340/310.04 |
| 4,755,792 | 7/1988 | Pezzolo et al. ..................... | 340/310.04 |
| 5,491,463 | 2/1996 | Sargeant et al. .................... | 340/310.04 |
| 5,521,491 | 5/1996 | Najam .................................. | 340/310.1 |

FOREIGN PATENT DOCUMENTS

| | | |
|---|---|---|
| 7-226778 | 8/1995 | Japan . |
| 1600056 | 10/1981 | United Kingdom . |

*Primary Examiner*—Daniel J. Wu
*Attorney, Agent, or Firm*—John D. Crane

[57] ABSTRACT

A power line communications system has at least one power line upon which noise level varies with time. The system determines quiet periods when noise upon the line is at a reduced level and transmits one or more data packets within the quiet periods, so as to increase data throughput in the system.

18 Claims, 12 Drawing Sheets

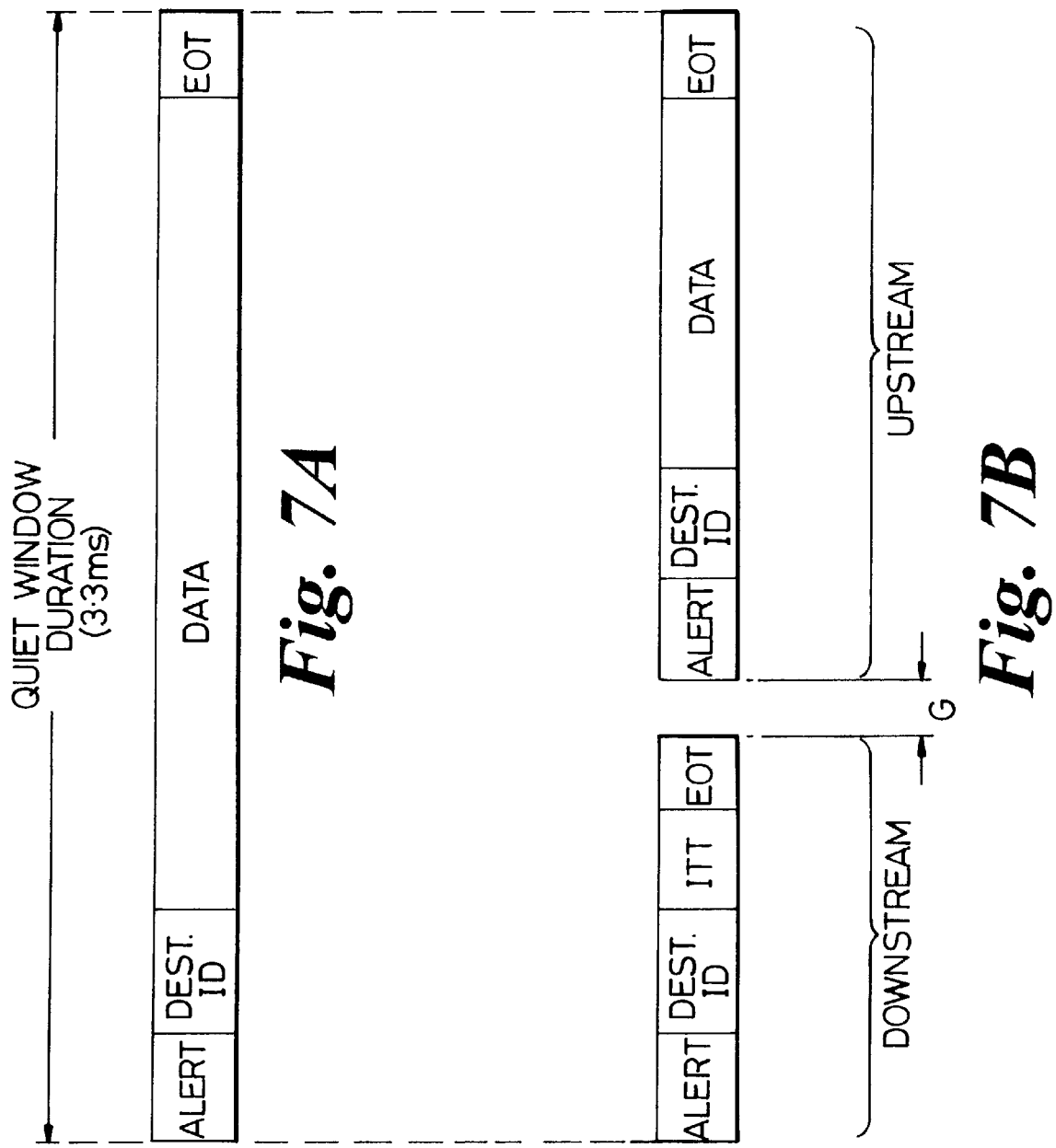

DATA TRANSMISSION OVER A POWER LINE COMMUNICATIONS SYSTEM

TECHNICAL FIELD

This invention relates to transmission of data over a power line.

BACKGROUND OF THE INVENTION

It is known to transport telecommunications signals over an electricity distribution or power transmission network. Delivering a telecommunications service in this manner is attractive as it avoids the need to install new cabling to each subscriber. By using existing electricity distribution cabling to carry telecommunications signals, significant cost savings are possible.

There are essentially two known methods for transmitting data over power lines. A first method uses the power signal itself, modifying the shape of the power signal at certain known points in response to the data which is to be carried. An example of this is shown in UK Patent GB 1,600,056. A second method uses a carrier signal having a different frequency from that of the power signal, the carrier signal being modulated by the data.

Power lines are subject to significant levels of noise and interference. A first type of noise is due to cables picking up radio signals such as broadcast AM radio signals and amateur radio band transmissions. Overhead cables are particularly prone to this type of noise. A second type of electrical noise is due to electrical equipment coupled to the power lines. Electric motors, thermostats and gas discharge lighting are particularly prone to generating noise. Noise propagates along the power lines and combines with communications signals. The level of noise is frequently high enough, and persists for long enough, to corrupt communications signals.

Noise imposes several constraints when using the power line to carry data. Firstly, data which is corrupted by the noise requires re-transmission. Secondly, each transmission must include a high error detection and correction overhead to ensure that corrupted data is detected and, if possible, corrected at the receiving unit. Both of these factors reduce throughput over the transmission medium, which results in a subscriber experiencing longer transmission times and a higher probability of blocking when they attempt to access the communications medium.

A known protocol called 'X-10' transmits short bursts of a 120 kHz tone at regular points in an AC power signal. The X-10 protocol is intended for in-house signalling to control lighting and electrical equipment and has a slow rate of data transfer. A binary '1' is represented by a short burst of 120 kHz tone and a binary '0' is represented by absence of the 120 kHz tone, the tones being transmitted shortly after the zero-crossing points of the power line signal. A single bit of data is transmitted after each zero-crossing point.

Japanese Laid Open Patent Publication (A) JP-07-226778 describes a transmission system in which data is continuously transmitted over an electrical power distribution line at a low data rate and sampling of the data signal is performed near a zero-crossing point of the power supply voltage.

The present invention seeks to provide an improved data transmission scheme.

SUMMARY OF THE INVENTION

According to one aspect of the present invention, there is provided a method of transmitting data over a power line upon which noise level varies with time, the method comprising:

determining a quiet period when noise upon the power line is at a reduced level; and transmitting at least one data packet over the power line within the determined quiet period.

Transmitting during a quiet period has the advantages of reducing the amount of data requiring retransmission and allowing a lower error detection and correction overhead in each packet which improves throughput of data over the power line and reduces blocking of other users. Transmitting a self-contained data packet during a quiet period rather than a single bit of data that is part of a longer message also provides increased data throughput and allows better use to be made of the quiet periods occurring on the line. Each quiet period that occurs on the line can be used to transmit data to a particular subscriber independently of the use made of other quiet periods.

The method is particularly efficient at increasing throughput where the power line comprises a plurality of phase lines, and the step of transmitting comprises transmitting a data packet to a subscriber station on a particular phase line only during a quiet period occurring on that phase line. It has been found that quiet periods tend to occur independently of one another such that one phase line will experience a quiet period while the other phase lines are experiencing a high level of noise. Advantageously the method comprises sequentially transmitting to subscribers that are coupled to different phase lines, one at a time, in a cyclic fashion. Transmitting to a particular subscriber only during a quiet period on their line, rather than repeating a transmission several times to coincide with quiet periods on each line, further increases data throughput.

Where each power signal has a period T, the step of transmitting can comprise transmitting over a particular phase line within the quietest duration T/n on that line. This quietest duration T/n may be divided among two or more quiet windows depending on the frequency of the noise envelope.

Preferably the power line carries a periodic power signal, the quiet periods being located about a characteristic point of the power signal, and wherein the step of determining a quiet period comprises determining the quiet period based on the timing of the characteristic point.

Advantageously the power signal is an alternating power signal which has a plurality of zero-crossing points, the quiet periods extending each side of the zero-crossing points, and the step of transmitting comprises transmitting the data packet such that it extends in time each side of the zero-crossing point. This has the advantage of making best use of the quiet period.

The data packet can be transmitted such that it extends unequally each side of the zero-crossing point, such as where a particular part of the packet contains important data, such as a token.

Preferably the step of determining quiet periods comprises predicting future quiet periods based on the periodic nature of the power signal. Noise level on the line can also be monitored and the quiet period can be determined based on the timing of the characteristic point and the monitored noise.

A base station can determine the phase line to which a subscriber station is coupled by:

instructing the subscriber station to transmit a test signal, and monitoring quality of the test signal received on each phase line at the base station.

Where the power line comprises a plurality of phase lines which each carry a power signal, the power signals being offset from one another by a predetermined phase relationship, the quiet periods can be determined by monitoring a first phase line and determining quiet periods on other phase according to the monitoring of the first phase line and the predetermined phase relationship. This avoids the need for one monitor for each phase line.

In situations where the data packet contains a token, the packet can be transmitted such that the token is transmitted during the quietest portion of the determined quiet period.

A downstream packet can be transmitted from a first station to a second station and an upstream packet can be transmitted from the second station to the first station during the determined quiet period. This allows the majority of the equipment required for the method to be located at the first station.

A quiet period can be determined by monitoring noise level on the power line. Advantageously the method can identify, from the monitored noise, a periodic noise pattern and predict future quiet periods based on the identified pattern.

Another aspect of the invention provides a method of operating a transmitting station in a power line communications system comprising a power line upon which noise level varies with time, the method comprising:

determining a quiet period when noise upon the power line is at a reduced level; and transmitting at least one data packet over the power line within the determined quiet period.

A further aspect of the invention provides a transmitting station apparatus for use in a power line communications system which performs the above method.

A still further aspect of the invention provides a power line communications system comprising:

at least one power line upon which noise level varies with time;

means for determining a quiet period when noise upon the power line is at a reduced level; and, means for transmitting at least one data packet over the power line within the determined quiet period.

Preferred features may be combined as appropriate, and may be combined with any of the aspects of the invention, as would be apparent to a person skilled in the art.

The term 'noise' is intended to cover a wide range of unwanted signals, including sparking noise, impulsive noise, noise transients and interference signals.

The data that is carried in this system can be used for computer applications such as home working, file transfer, internet access and a wide range of other applications.

BRIEF DESCRIPTION OF THE DRAWINGS

For a better understanding of the invention, and to show by way of example how it may be carried into effect, embodiments will now be described with reference to the accompanying drawings, in which:

FIG. 7A shows an example of a data packet and FIG. 7B shows an example of transmitting a downstream packet and an upstream packet together during a quiet period;

DESCRIPTION OF PREFERRED EMBODIMENTS

Figure 1:
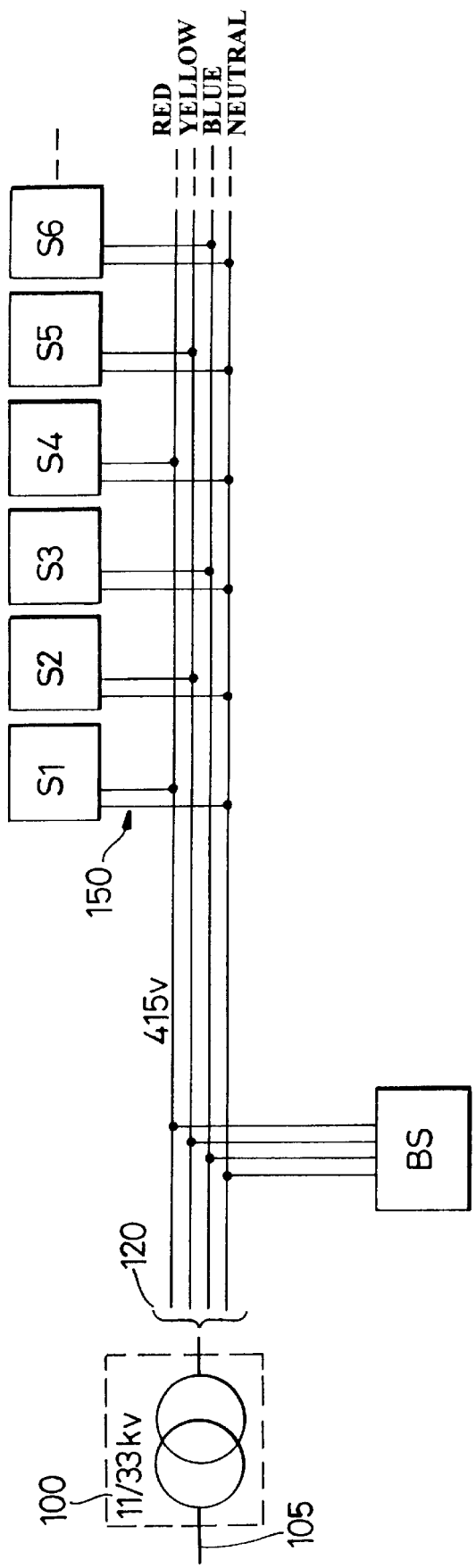
FIG. 1 shows a power line communications system.

FIG. 1 shows an electricity distribution network which is adapted to carry telecommunications signals. Mains electricity enters the network from an 11 kV or 6.6 kV transmission line 105 and is transformed by substation 100 into a 400V supply which is delivered over distribution cable 120 to subscriber stations S1 to S6. The subscriber stations are typically located at houses or businesses. Distribution cable 120 comprises blue, red and yellow phase lines and a neutral line. A full system will usually include more than the six subscriber stations shown here and will typically include a more elaborate tree-and-branch distribution network. Subscriber premises may receive a single phase electricity supply (230V) or a three-phase electricity supply (400V). Domestic subscriber premises usually receive a single phase supply and neighbouring subscriber premises are usually coupled to different phase lines. In FIG. 1 subscriber S1 is shown coupled to the red phase line, and subscriber S2 is coupled to the yellow phase line. This helps to distribute the load of the network evenly across the three phases.

A base station BS couples data signals onto distribution cable 120. The communications signals propagate over the cable to transceiver units at subscriber premises S1 to S6. Subscribers couple to a phase line of distribution cable 120 by a branch line 150. In the upstream direction, communications signals are transmitted from the subscriber transceiver units towards the base station. Communications signals are preferably transmitted between a phase line and neutral or earth. Data can be transmitted using a variety of line coding or modulation techniques. Applicant uses Frequency Shift Keying (FSK) modulation about a centre-frequency of 2.9 MHz. Other frequency bands in the range of, for example, 2–30 MHz can be used although it is preferred to use the lower frequencies because attenuation over the distribution cables is lower. The upstream and downstream transmissions can be time-division multiplexed, with the upstream and downstream transmissions sharing a common frequency band, or frequency-division multiplexed where the upstream and downstream transmissions occupy different frequency bands.

Figure 2A:
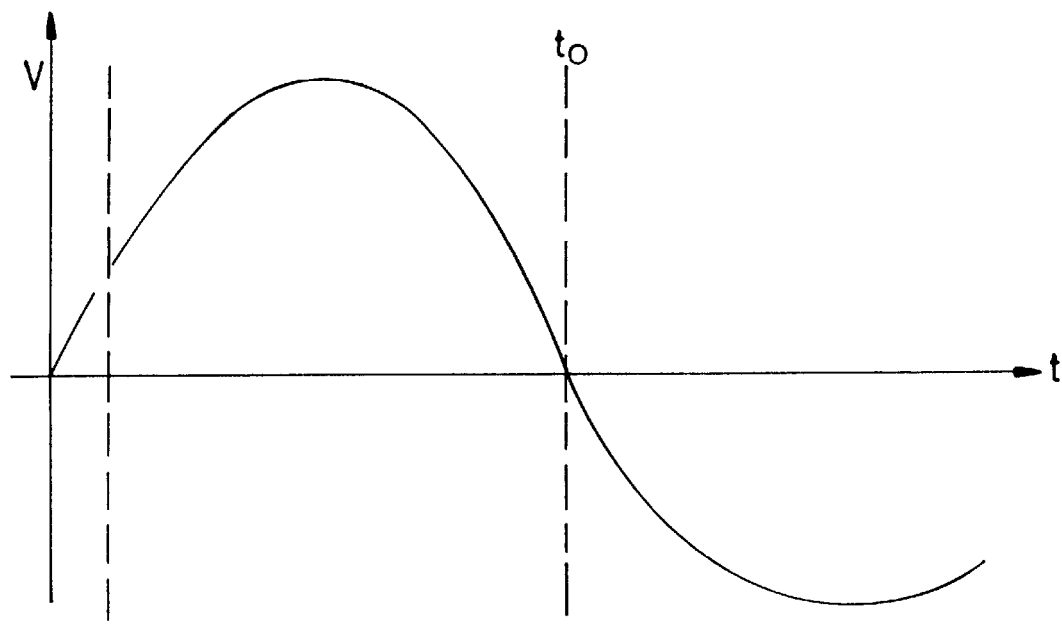
FIGS. 2A and 2B respectively show mains signal voltage and one example of noise power on one phase line of the system of FIG. 1 over a time period.
Figure 2B:
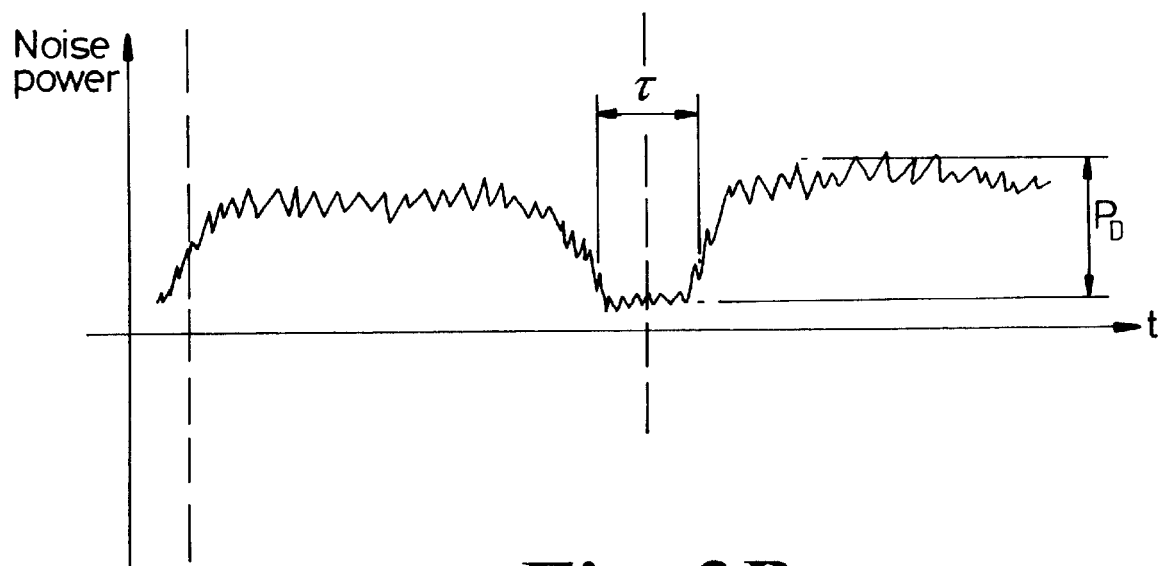

FIG. 2A is a plot of a typical mains waveform carried on one of the phase lines, showing voltage against time. FIG. 2B is a plot of one example of noise power against time occurring during the corresponding time interval. Noise power is not constant, but varies with time. It has been found that the noise power on the line varies according to the voltage of the mains signal. There are periods τ when noise power is significantly reduced on the line, and at such times the reduction in noise power $P_D$ can be of the order of 20 dB. It has been found that much of the noise is caused by sparking across contacts. Sparking is an effect which is dependent upon voltage, and which is significantly reduced below certain voltages. Thermostats, switches and electric motors are examples of equipment which generate this form of noise. Different types of electrical equipment will each have its own characteristic threshold levels below which sparking tends not to occur, and the noise power on a line will be the summation of the individual sources of noise contributed by all equipment coupled to the network. Also, thyristor-controlled dimmer switches and gas discharge lighting are known to generate impulsive noise at certain times during the AC voltage cycle.

With an alternating mains signal, there can be regular periodic time periods τ during which noise power is at a minimum level. These quiet periods extend each side of the points at which the mains voltage crosses the zero level, shown as $t_o$ in FIG. 2A. These points will be referred to hereinafter as zero-crossing points. The periodic nature of these quiet periods allows the time of future periods to be predicted based on the timing of previously detected periods. For a 50 Hz a.c. signal zero-crossings will occur at 10 ms intervals. The shape of the noise envelope can vary depending on the equipment coupled to the network at a particular time. In FIG. 2B the noise power envelope has a frequency of 100 Hz, i.e. twice the mains frequency. Under other conditions, such as when the noise is dependent upon the polarity of the mains signal, the noise power envelope can have a frequency equal to the mains frequency. Under other conditions the noise envelope can have some other frequency.

Data packets have a duration which is equal to, or slightly shorter than, the quiet period and are transmitted so as to fit within the quiet period.

Figure 3A:
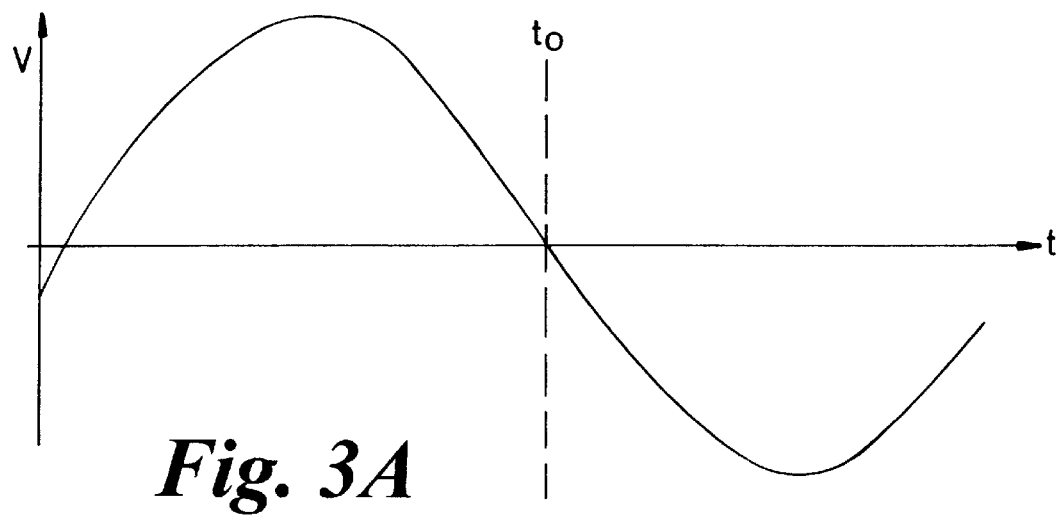
FIGS. 3A and 3B respectively show mains signal voltage and another example of noise power on one phase line of the system of FIG. 1 over a time period.
Figure 3B:
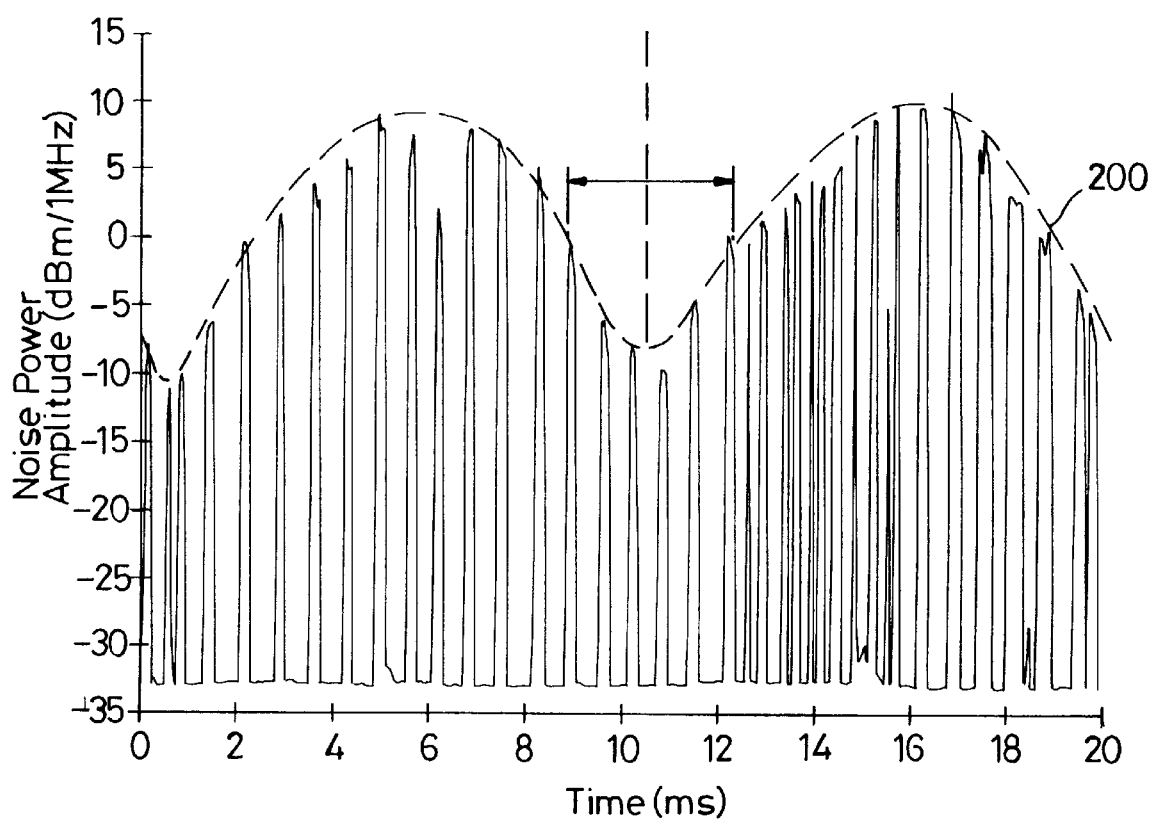

Under some conditions the quiet period does not have sharply-defined boundaries at which the noise level abruptly changes, but instead the noise level progressively increases each side of the mains zero-crossing point as shown by envelope 200 in FIG. 3B. This graph is an actual plot of noise generated by a faulty thermostat. There are still advantages in transmitting data during the quietest portion of the noise envelope. Where there are three phase lines, each carrying a power signal which is offset in phase with respect to the others, it is preferred to transmit data on a particular phase line during the quietest third of the period of the power signal, as shown in FIG. 3B. With a mains frequency of 50 Hz and a noise envelope which has a frequency of 100 Hz this corresponds to two quiet periods each lasting 3.3 ms during one AC voltage cycle.

Figure 4:
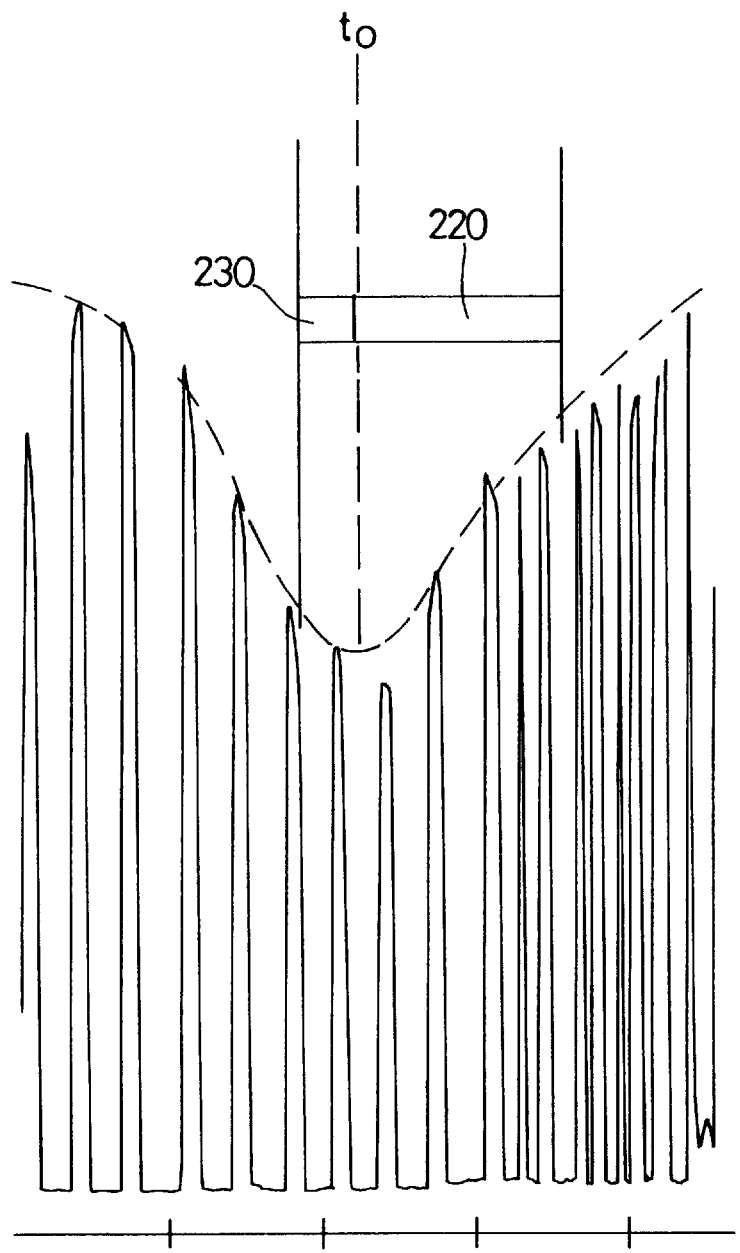
FIG. 4 shows an example of asymmetrically transmitting a data packet about a zero-crossing point.
Figure 5:
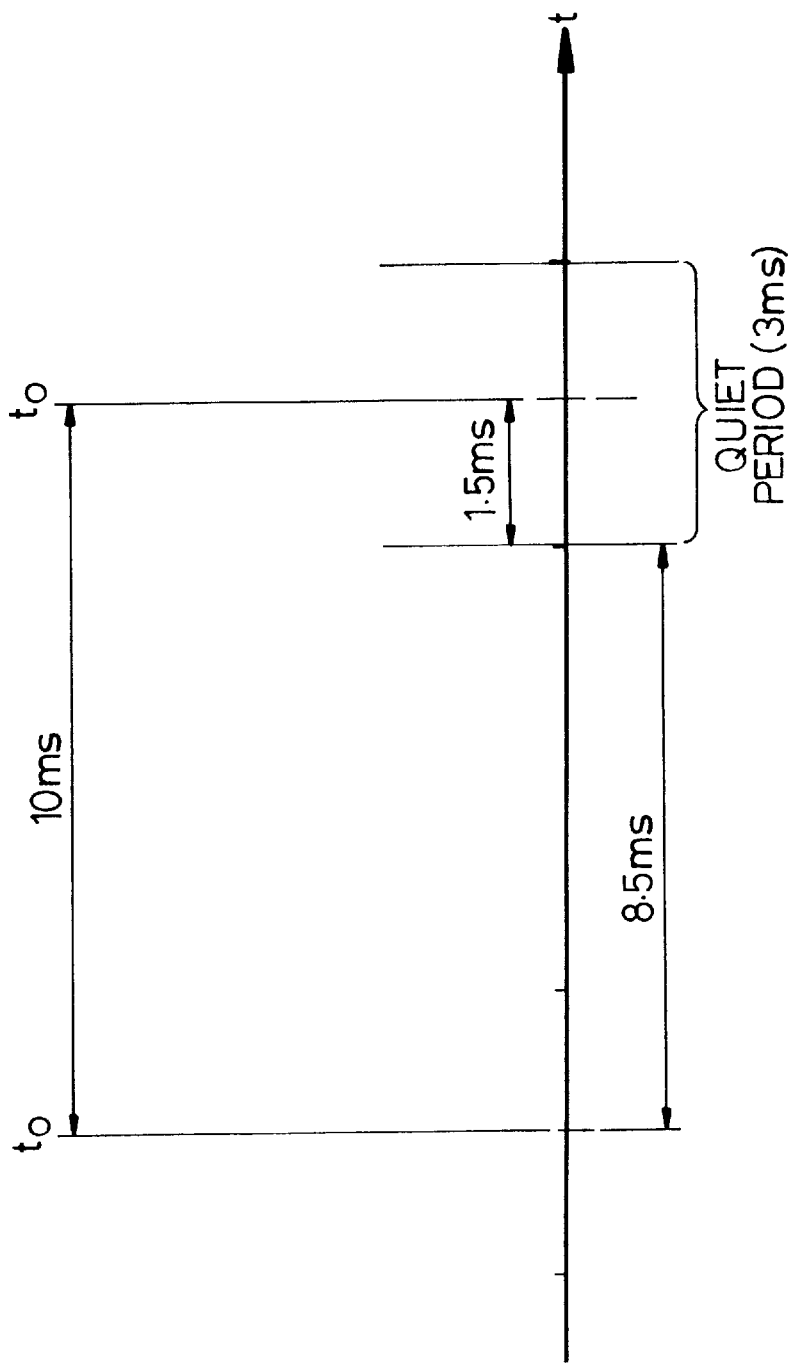
FIG. 5 shows an example of calculating the timing of quiet periods, based on zero-crossing points.

A data packet can be transmitted such that it is symmetrical about the zero-crossing point of the mains signal, or it can be transmitted such that it is asymmetrical about the zero-crossing point. Asymmetrical transmission has a particular use where access to the network is controlled by a token-passing protocol. In a token-passing protocol it is particularly important that the token that is carried by data packets is not corrupted or lost. The token usually comprises a special bit pattern carried in an access burst and an address of the subscriber station to which the packet is destined. By timing the transmission of data packets such that the portion of the packet that includes the token corresponds to a time when noise is close to its minimum level, the risk of losing the token can be minimised. For example, where the token is transmitted at the beginning of a packet, the packet can be timed such that the majority of the packet is transmitted after the zero-crossing point such that the token is transmitted during the time at which noise is close to its minimum level. FIG. 4 shows an example of transmitting a data packet 220 asymmetrically about the zero crossing-point $t_o$, such that token 230 is transmitted at a time at which the noise power is at its minimum level.

Where quiet periods are known to be located about a characteristic feature of the power signal, such as the zero-crossing points, it is convenient to determine when quiet periods occur by monitoring for the occurrence of zero-crossing points. Zero crossing points can be detected by using a voltage comparator which continually compares the line voltage with a reference value of zero volts. Where the quiet period extends each side of the zero-crossing point and it is desired to make full use of the quiet period, it is necessary to predict when future zero-crossings will occur, and from that predicted time and the knowledge of the quiet window duration, to predict the time when the future quiet window will start. This is described with reference to FIG. 5. A 50 Hz mains signal has zero-crossings $t_o$ occurring every 10 ms. Assuming that a quiet window lasts for 3 ms, divided equally about the zero-crossing point, it can be seen that a quiet window begins 1.5 ms before each zero-crossing point, or 8.5 ms after a zero-crossing point. Therefore, by detecting a zero-crossing point $t_o$ and waiting for 8.5 ms, a data packet can be transmitted at the beginning of the next quiet period.

It is possible to measure actual noise level on the line and to use this measurement to vary the length of the quiet window. The measurements of noise power can be analysed by techniques such as looking for excursions above particular threshold levels of noise power.

Figure 6A:
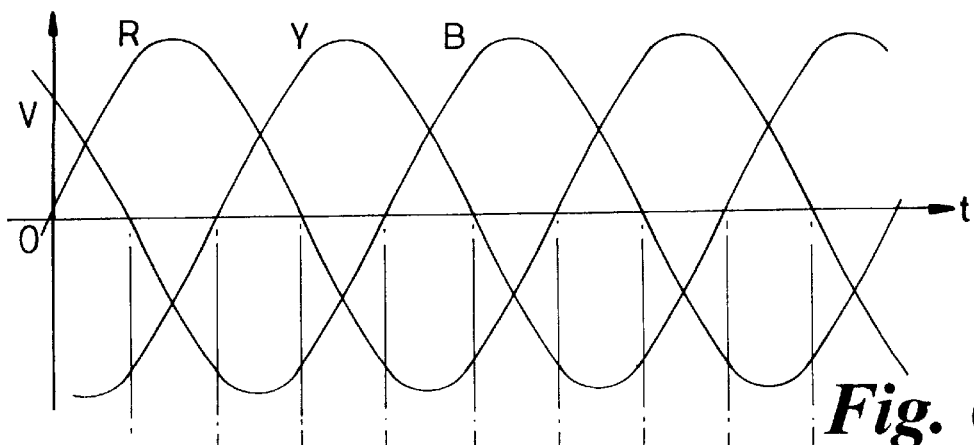
FIG. 6A shows three mains phase signals and FIGS. 6B, 6C, 6D show noise powers on each of the phase lines over a time period.
Figure 6B:
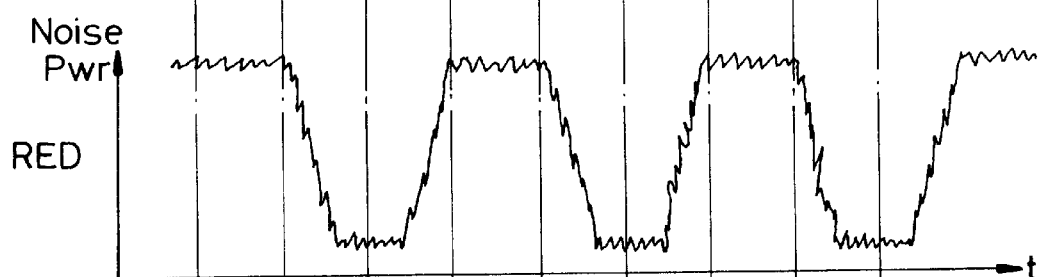
Figure 6C:
Figure 6D:

FIG. 6A is a plot of voltage against time for the power signals carried on the three phase lines Red, Yellow, Blue. The power signal on each phase line is spaced apart by 120°. FIGS. 6B, 6C, 6D respectively depict a plot of typical noise power against time for the Red, Yellow and Blue phase lines for the corresponding time interval. Quiet periods on the different phase lines are offset from one another in time by 120°, corresponding to the occurrence of the zero-crossing points on the lines. It can be seen that quiet periods successively occur on each phase line; in the example shown in FIGS. 6B–6D the sequence of quiet periods is blue, yellow, red, blue, yellow, red. Advantage can be taken of the quiet periods by successively transmitting over each of the phase lines in synchronism with the quiet periods.

One of the characteristics of an electrical distribution cable is that at radio frequencies (RF) the capacitance which exists between different phase lines in the cable causes signals which originate on one phase line to leak onto a neighbouring phase line. Referring to FIGS. 6B and 6C, this effect will cause some of the noise power on yellow phase line to leak into the red phase line. The extent to which this occurs depends on frequency of the bearer used for transmission and on the particular structure of cable. Even with this leakage, the quiet period on a line still offers a significantly reduced noise level. It is also noted that while noise sources at short range from a receiver cause interference levels at the highest power, the coupling between phase lines is relatively weak at short ranges.

FIG. 7A shows one example of the structure of a data packet. The duration of the packet is shown as 3.3 ms, to correspond to a quiet period duration of 3.3 ms as discussed above, but it can have a different duration. The packet comprises an alert burst (ALERT) which includes a special bit pattern, known by subscriber stations, an address of a subscriber station to which the packet is detined (DEST. ID), a data payload (DATA) and an end-of-transmission flag (EOT).

So far the idea of transmitting during quiet periods has been described without reference to the upstream or downstream directions of transmission, as it is equally applicable to both. However, given that a data system is usually asymmetrical in the sense that downstream traffic is much greater than upstream traffic, it is economical to include the processing equipment at the base station for use with downstream transmissions. FIG. 7B shows a way in which a downstream packet from a base station to a particular subscriber station and an upstream packet from that subscriber station to the base station can be sent one after the other within a quiet period. The downstream packet is sent at the beginning of the quiet period and includes an alert burst (ALERT), address of the subscriber station (DEST. ID), an invitation-to-transmit flag (ITT) and an end-of-transmission flag (EOT). After a short guard space (G) the subscriber station responds with an upstream transmission comprising comprises an alert burst (ALERT), address of the base station (DEST. ID), a data payload (DATA) and an end-of-transmission flag (EOT).

Figure 8:
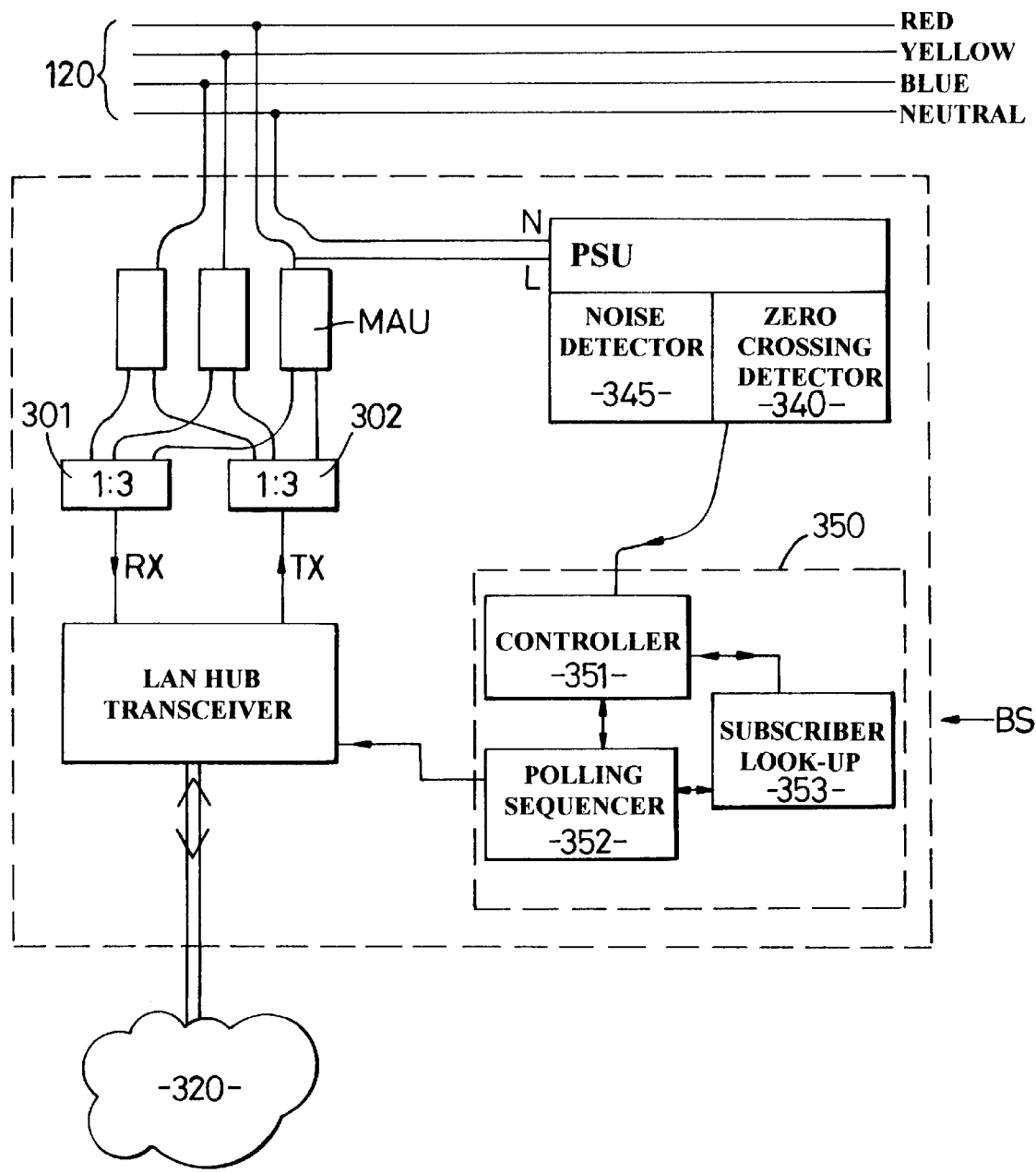
FIG. 8 shows the base station of FIG. 1 in more detail.

FIG. 8 shows the base station BS of FIG. 1 in more detail. A branch is taken from each of the phase lines (Red, Yellow, Blue) and the neutral line. Each phase line is coupled to a medium adapter unit MAU which comprises a high-pass filter to pass signals in the band used for communications and to block the flow of mains electricity at 50 Hz or 60 Hz. Each MAU also includes amplifiers for individually adjusting the level of an upstream signal received from cable 120 and a downstream signal prior to transmission over cable 120. A combiner 301 combines a received signal from each MAU for applying to LAN Hub transceiver, and a splitter 302 splits a signal output by the LAN hub transceiver three ways to apply a portion to each MAU for transmission over each phase line.

LAN hub transceiver routes data packets to the telecommunications network. The transceiver couples to external transmission network 320 and transports telecommunications signals to and from network 320.

Blocks 340 and 350 comprise the main equipment which is required for implementing transmission during quiet periods.

It is possible to monitor each phase individually by tapping each of the phase lines, such as by tapping at the point just before the MAU.

However, knowledge of the offset between each phase line (120°) allows a single phase line to be monitored and other quiet periods to be calculated from that. A convenient way of monitoring a single phase line is by incorporating a zero crossing detector 340 into the base station power supply unit PSU, which derives a single phase supply from the distribution cable.

An output from detector 340 is fed to controller 351. The controller calculates the time when future quiet periods will occur on each of the phase lines, based on the known periodic nature of the a.c. signal and the known relationship between the phase lines. Updates from detector 340 on times when zero crossings actually occur allows the controller to maintain accurate predictions. In addition to, or instead of zero-crossing detector 340, a noise detector 345 can be provided to monitor actual noise on the line and provide information to controller 351 for use in changing timing of quiet periods. Noise detector 345 in combination with controller 351 can be arranged to analyse the monitored noise on the line to detect a periodic noise pattern and to predict future quiet periods based on the identified pattern.

Polling sequencer 352 co-ordinates the order in which data subscribers on the network are polled, with reference to subscriber look-up table 353. The look-up table is a memory with a list of each data subscriber and the phase line to which they are coupled.

Two ways of compiling the list in look-up table 353 are as follows:

(i) Manual Entry. An engineer checks (from plans of the network or an inspection of a subscriber's installation) which phase a new subscriber for the data service is connected to and adds this information to look-up table 353. The update can be made by an engineer visiting the base station or by a down-loading operation from a remote terminal.

Figure 9:
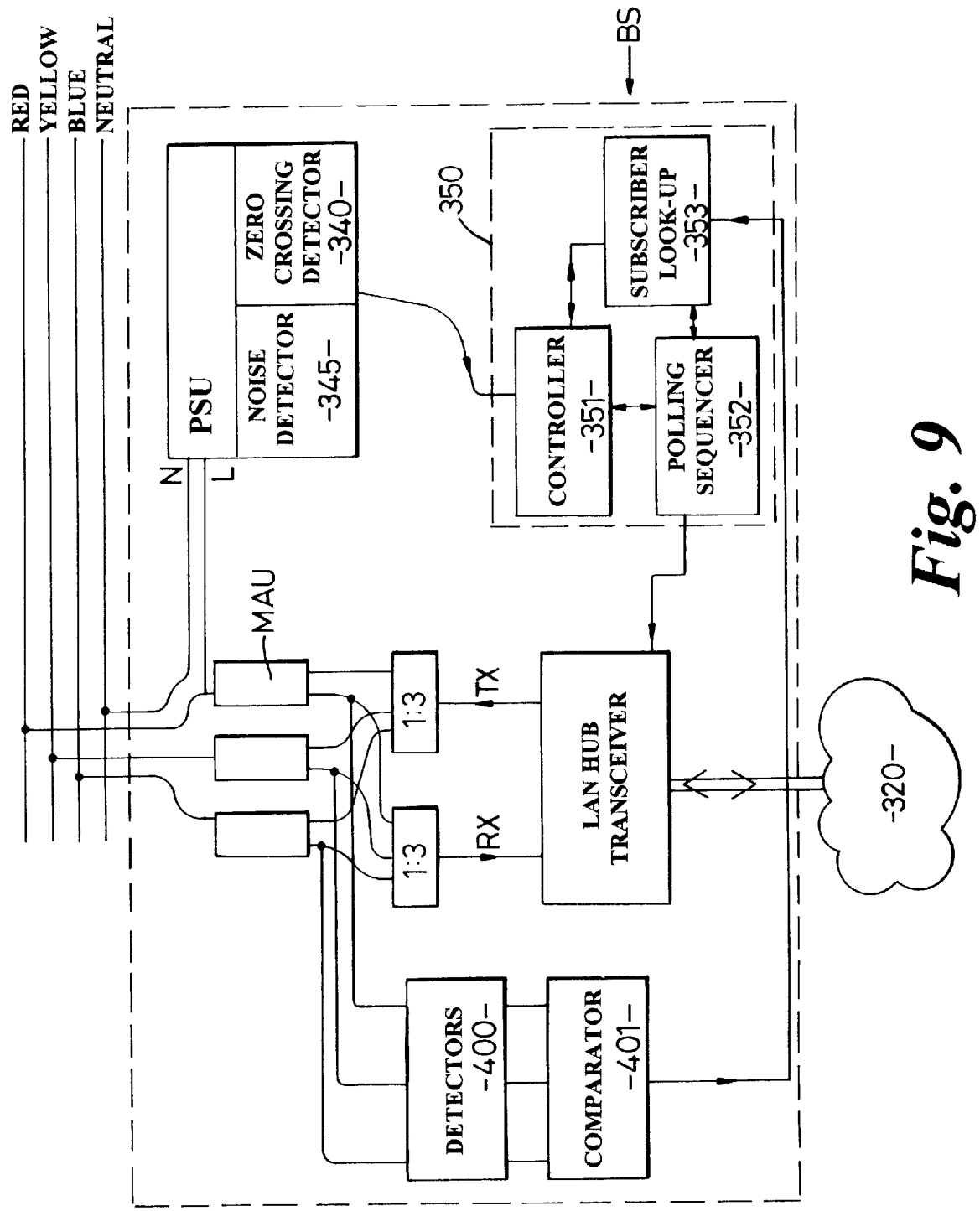
FIG. 9 shows an alternative form of the base station of FIG. 8.
Figure 10:
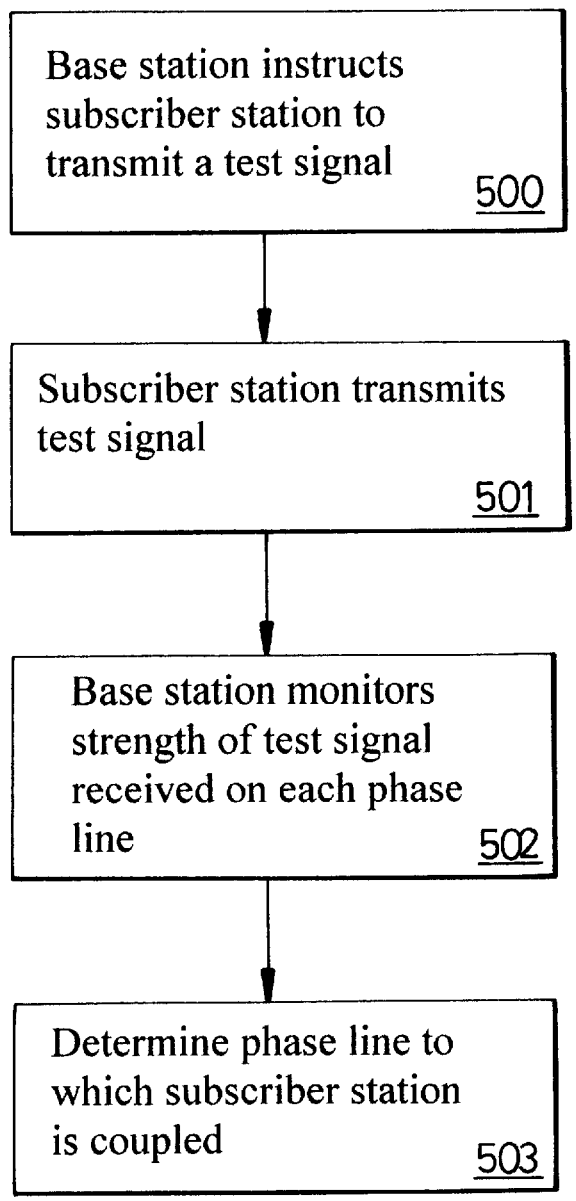
FIG. 10 shows a method of operating the power line communications system using the base station of FIG. 9.

(ii) Power Sensing. The modifications required to the base station to implement this are shown in FIG. 9, and the method by which the base station selects the optimum phase line is shown in the flow-diagram of FIG. 10. At step 500 the base station transmits a signal requesting that a particular subscriber station transmits a test signal. The subscriber station responds, at step 501, by transmitting a test signal. A bank of power detectors 400, one detector per phase line, are coupled to the outputs of the MAUs at the base station. At step 502 a comparator 401 compares the outputs of the detectors during reception of a test signal from a new subscriber. At step 503 the base station determines, from the detector outputs, which phase line provides the strongest signal and hence to which phase line the subscriber is coupled. This is entered, under the control of controller 351, into look-up table 353. A measurement other than signal strength can be used in determining the best phase line that a subscriber is coupled to; e.g. quantities such as bit error rate (BER) can be used. For this method to be used reliably, and correctly identify the line to which a subscriber is coupled, the test signal should be at the lower end of the frequency range used for transmission. This is because coupling between the phase lines generally decreases with transmission frequency.

The operation of the polling sequencer will now be described in more detail. The polling sequencer adapts the manner in which data subscribers are polled according to demand from the users. Some scenarios will now be considered.

Figure 11:
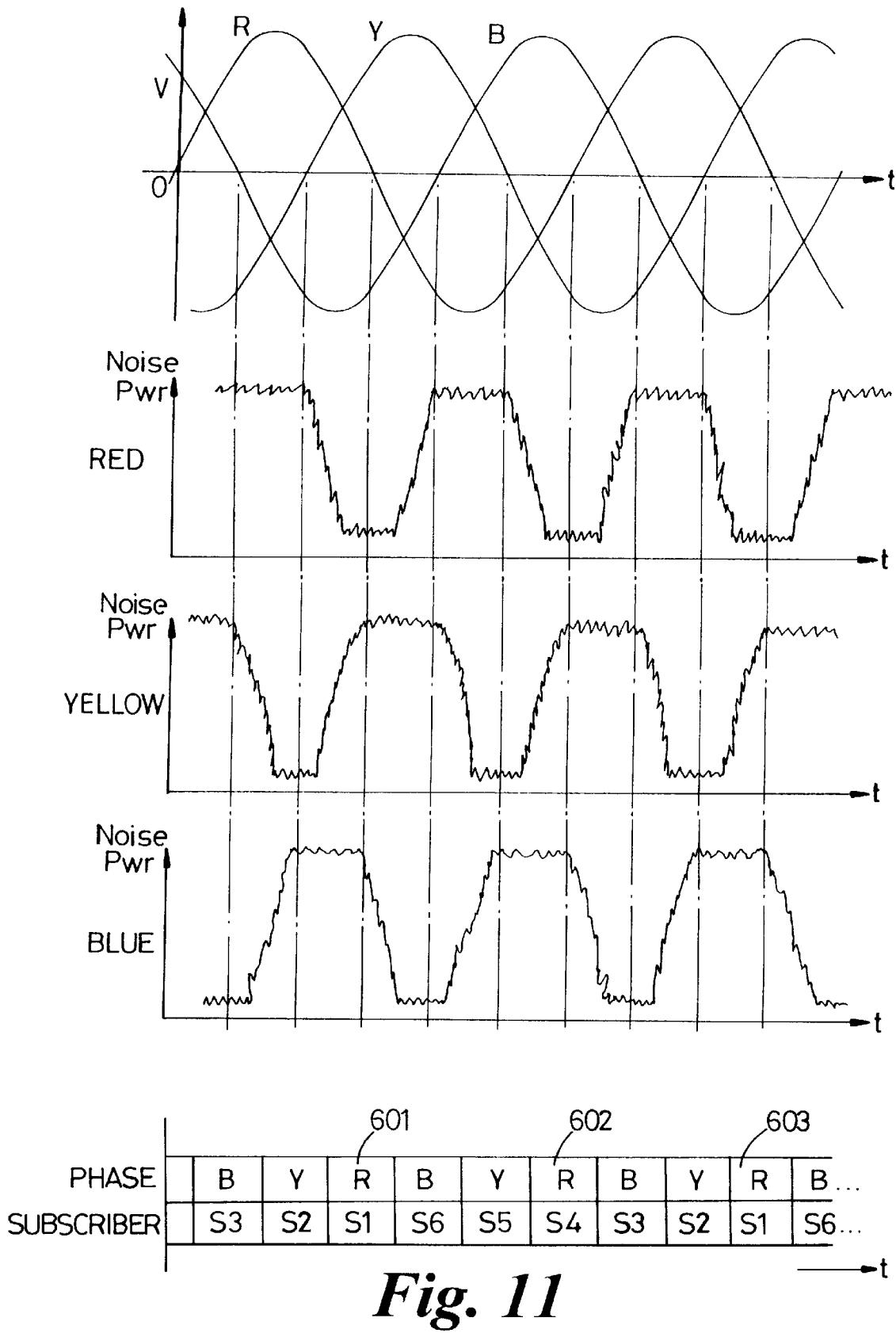
FIG. 11 shows one example of a scheme for allocating subscribers access to the distribution cable.

1.) High demand, equally divided between data subscribers on each phase.
  sequencer allocates timeslots preferentially to subscribers during quiet periods on the phase line to which they are connected. FIG. 11 illustrates how six subscribers S1–S6, coupled in the manner shown in FIG. 1, are polled. Subscribers S1 and S4 are coupled to the red phase line. During the quiet periods on red 601, 602, 603 subscribers S1 and S4 are polled, by transmitting data packets which are addressed to these subscribers. Quiet periods are shared among the subscribers on that phase. In this example alternate quiet periods on the red line are allocated to a particular subscriber, e.g. subscriber S1 is allocated slots 601 and 603.

2.) Low demand—equally divided between data subscribers on each phase.
  sequencer allocates timeslots preferentially to subscribers during quiet periods on the phase line to which they are connected, as in case (1).

3.) High demand—unequally divided between the phases.
  sequencer preferentially allocates timeslots to correspond with quiet periods on the phase line to which subscribers are connected, but also allocates non-optimum slots. An example will illustrate this technique. Consider demand from two data subscribers: S1 on red phase, S2 on yellow phase and no demand from subscribers on blue. A possible polling sequence is:

| Window on: | R  | Y  | B  | R  | Y  | B  | ... |
|------------|----|----|----|----|----|----|-----|
| Subscriber:| S1 | S2 | S1 | S1 | S2 | S2 | ... |

Subscribers S1 (Red) and S2 (Yellow) are allocated quiet periods on the phase line to which they are connected and, in addition, the non-optimum periods on the blue phase line are alternately allocated to S1 and S2.

Figure 12:
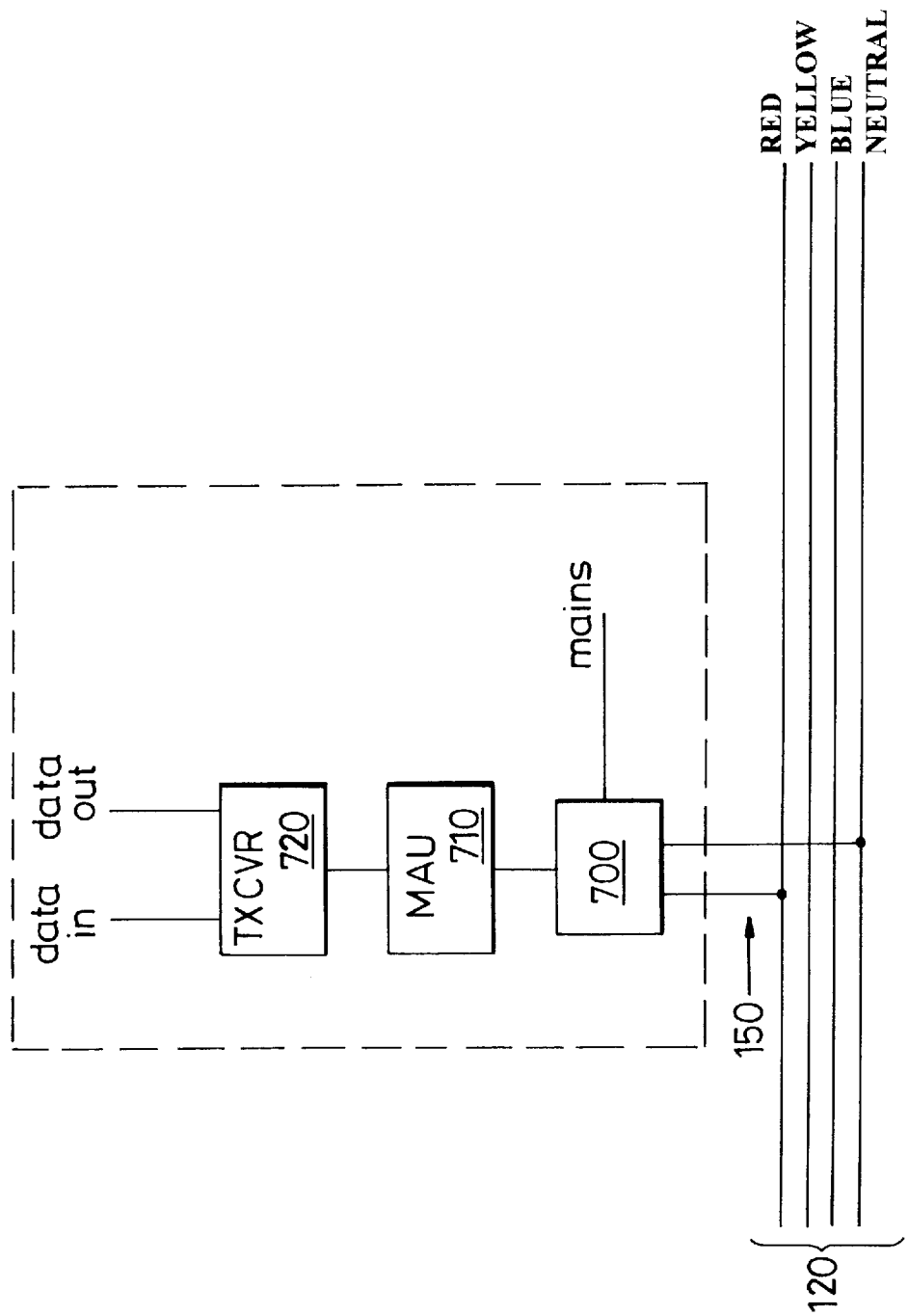
FIG. 12 shows a typical subscriber station equipment in more detail.

FIG. 12 shows a typical installation at a residence which subscribes to the data service. Branch cable 150 represents a conventional mains branch cable which couples to one of the three phase lines in distribution cable 120. Coupling unit 700 couples communications signals to and from cable 150, allowing the mains supply to pass. Medium adapter unit 710 may include one or more amplifiers to adjust the level of signals in the upstream (transmit) and downstream (receive) directions. Transceiver 720 receives data packets and converts them into an output data stream for coupling to equipment in the subscriber's home such as a personal computer which is accessing the Internet or a home-banking service. The transceiver also converts an incoming data stream into data packets which are transmitted to the base station.

A variety of conventional local area network protocols can be used on the network. A preferred protocol is token-passing bus, such as IEEE 802.4, ANSI 878.1 or Universal Serial Bus (USB). This is a disciplined access technique in which a token controls the right of access to the transmission medium. The token is passed from one subscriber to another in rotation. When a subscriber receives the token, in a packet which carries an address corresponding to the subscriber's own address, the subscriber identifies that it has the token and replies to the base station. The typical peak data rate of the system is in the region of 1 Mbit/s.

I claim:

1. A method of transmitting data in a power line communications system comprising a power line upon which noise level varies with time, the power line comprising a plurality of different phase lines, there being a plurality of subscriber stations coupled to the phase lines, the method comprising:

determining quiet periods when noise upon the phase lines is at a reduced level; and transmitting data packets over the power line to subscriber stations, each packet being transmitted within a single one of the determined quiet periods, wherein each of the packets is preferentially transmitted to a subscriber station on a phase line during a quiet period occurring on that phase line.

2. A method according to claim 1 wherein the power line carries a periodic power signal, the quiet periods being located about a characteristic point of the power signal, and wherein the step of determining a quiet period comprises determining the quiet period based on the timing of the characteristic point.

3. A method according to claim 2 wherein the power signal is an alternating power signal which has a plurality of zero-crossing points, the quiet periods extending each side of the zero-crossing points, and the step of transmitting comprises transmitting the data packet such that it extends in time each side of the zero-crossing point.

4. A method according to claim 3 wherein the data packet is transmitted such that it extends unequally each side of the zero-crossing point.

5. A method according to claim 2 wherein the step of determining quiet periods comprises predicting future quiet periods based on the periodic nature of the power signal.

6. A method according to claim 2 further comprising monitoring noise level on the line and determining the quiet period based on the timing of the characteristic point and the monitored noise.

7. A method according to claim 1 wherein the power line comprises n phase lines, each power signal has a period T, and the step of transmitting comprises transmitting over a particular phase line within the quietest duration T/n on that line.

8. A method according to claim 1 further comprising sequentially transmitting to subscribers coupled to different phase lines, one at a time, in a cyclic fashion.

9. A method according to claim 1 wherein the method is performed at a base station and the base station determines the phase line to which a subscriber station is coupled by:

instructing the subscriber station to transmit a test signal, and monitoring quality of the test signal received on each phase line at the base station.

10. A method according to claim 1 wherein the power line comprises a plurality of phase lines which each carry a power signal, the power signals being offset from one another by a predetermined phase relationship, and wherein the step of determining quiet periods comprises monitoring a first phase line and determining quiet periods on other phase according to the monitoring of the first phase line and the predetermined phase relationship.

11. A method according to claim 1 wherein the data packet contains a token and the step of transmitting comprises transmitting the packet such that the token is transmitted during the quietest portion of the determined quiet period.

12. A method according to claim 1 wherein the step of transmitting comprises transmitting a downstream packet from a first station to a second station and an upstream packet from the second station to the first station during the determined quiet period.

13. A method according to claim 1 wherein the step of determining a quiet period comprises monitoring a power supply line to a transmitting station.

14. A method according to claim 1 wherein the step of determining a quiet period comprises monitoring noise level on the line.

15. A method according to claim 13 further comprising identifying, from the monitored noise level on the line, a periodic noise pattern and predicting future quiet periods based on the identified pattern.

16. A method of operating a communications transmitting station in a power line communications system comprising a power line upon which noise level varies with time, the power line comprising a plurality of different phase lines, there being a plurality of subscriber stations coupled to the phase lines, the method comprising:

determining quiet periods when noise upon the phase lines is at a reduced level; and transmitting data packets over the power line to subscriber stations, each packet being transmitted within a single one of the determined quiet periods, wherein each of the packets is preferentially transmitted to a subscriber station on a phase line during a quiet period occurring on that phase line.

17. A transmitting station apparatus for use in a power line communications system comprising a power line upon which noise level varies with time, the power line comprising a plurality of different phase lines, there being a plurality of subscriber stations coupled to the phase lines; the apparatus comprising:

means for determining quiet periods when noise upon the phase lines is at a reduced level; and, means for transmitting data packets over the power line to subscriber stations, each packet being transmitted within a single one of the determined quiet periods, wherein each of the packets is preferentially transmitted to a subscriber station on a phase line during a quiet period occurring on that phase line.

18. A power line communications system comprising:

a power line upon which noise level varies with time, the power line comprising a plurality of different phase lines;

a plurality of subscriber stations coupled to the phase lines;

means for determining a quiet period when noise upon the phase lines is at a reduced level; and, means for transmitting data packets over the power line to subscriber stations, each packet being transmitted within a single one of the determined quiet periods, wherein each of the packets is preferentially transmitted to a subscriber station on a phase line during a quiet period occurring on that phase line.

* * * * *